US012689485B2

(12) United States Patent
Yang et al.

(10) Patent No.:    US 12,689,485 B2
(45) Date of Patent:       Jul. 21, 2026

(54) ON-DEMAND NON-DELAY MANAGED DEMODULATION REFERENCE SIGNAL FOR OPEN RADIO ACCESS NETWORK UTILIZING CHANNEL STATE INFORMATION

(71) Applicant: Mavenir Systems, Inc., Richardson, TX (US)

(72) Inventors: Roy Yang, Buffalo Grove, IL (US); Ali Fatih Demir, Allen, TX (US)

(73) Assignee: Mavenir Systems, Inc., Richardson, TX (US)

( * ) Notice: Subject to any disclaimer, the term of this patent is extended or adjusted under 35 U.S.C. 154(b) by 334 days.

(21) Appl. No.: 18/613,498

(22) Filed: Mar. 22, 2024

(65) Prior Publication Data

US 2024/0348398 A1     Oct. 17, 2024

Related U.S. Application Data

(60) Provisional application No. 63/496,449, filed on Apr. 17, 2023.

(51) Int. Cl.
H04L 5/00          (2006.01)
(52) U.S. Cl.
CPC .......... H04L 5/0051 (2013.01); H04L 5/0016 (2013.01)
(58) Field of Classification Search
CPC . H04L 5/0051; H04L 5/0016; H04L 25/0226; H04L 25/0228; H04B 7/0617
See application file for complete search history.

(56) References Cited

U.S. PATENT DOCUMENTS

| | | | |
|---|---|---|---|
| 12,598,043 B2 * | 4/2026 | Agarwal | ............... H04L 5/0051 |
| 2022/0021423 A1 | 1/2022 | Ahmed et al. | |
| 2023/0143457 A1 * | 5/2023 | Levitsky | ............... H04L 5/0096 |
| | | | 370/329 |
| 2023/0216552 A1 | 7/2023 | Jeon et al. | |

(Continued)

FOREIGN PATENT DOCUMENTS

| | | |
|---|---|---|
| EP | 3896860 | 10/2021 |
| KR | 20220037308 | 3/2022 |

OTHER PUBLICATIONS

Extended European Search Report of corresponding European application EP24169401.7, 5 pages, dated Sep. 20, 2024.

(Continued)

*Primary Examiner* — Pakee Fang
(74) *Attorney, Agent, or Firm* — Ruggiero McAllister & McMahon LLC

(57)          ABSTRACT

A system and method for providing messaging between an Open Radio Access Network Distributed Unit (O-DU) and an Open Radio Access Network Radio Unit (O-RU) for on-demand non-delay-managed Demodulation Reference Signal (DMRS) transfer and improving beamforming. An O-DU sending a request message with Demodulation Reference Signal (DMRS) configuration information to an O-RU, and the O-RU extracts non-port-reduced DMRS data and transmits it in a non-delay managed manner to the O-DU. The O-DU identifies one or more users that need an improved update rate of channel state information and triggers the non-port-reduced DMRS transfer based on at least a doppler speed of the user and/or an inter-cell interference level due to user density.

18 Claims, 15 Drawing Sheets

(56)         References Cited

U.S. PATENT DOCUMENTS

2024/0275556 A1*  8/2024  Chen ................... H04W 72/232
2024/0422774 A1*  12/2024  Ryu .................... H04B 7/0456
2026/0058773 A1*  2/2026  Huang ...................... H04L 5/00

OTHER PUBLICATIONS

O-RAN WG4 Work Item Description, "Improved 7-2x UL Performance for mMIMO; version 5.0" O-Ran Alliance; Aug. 2023.

* cited by examiner

Figure 10:
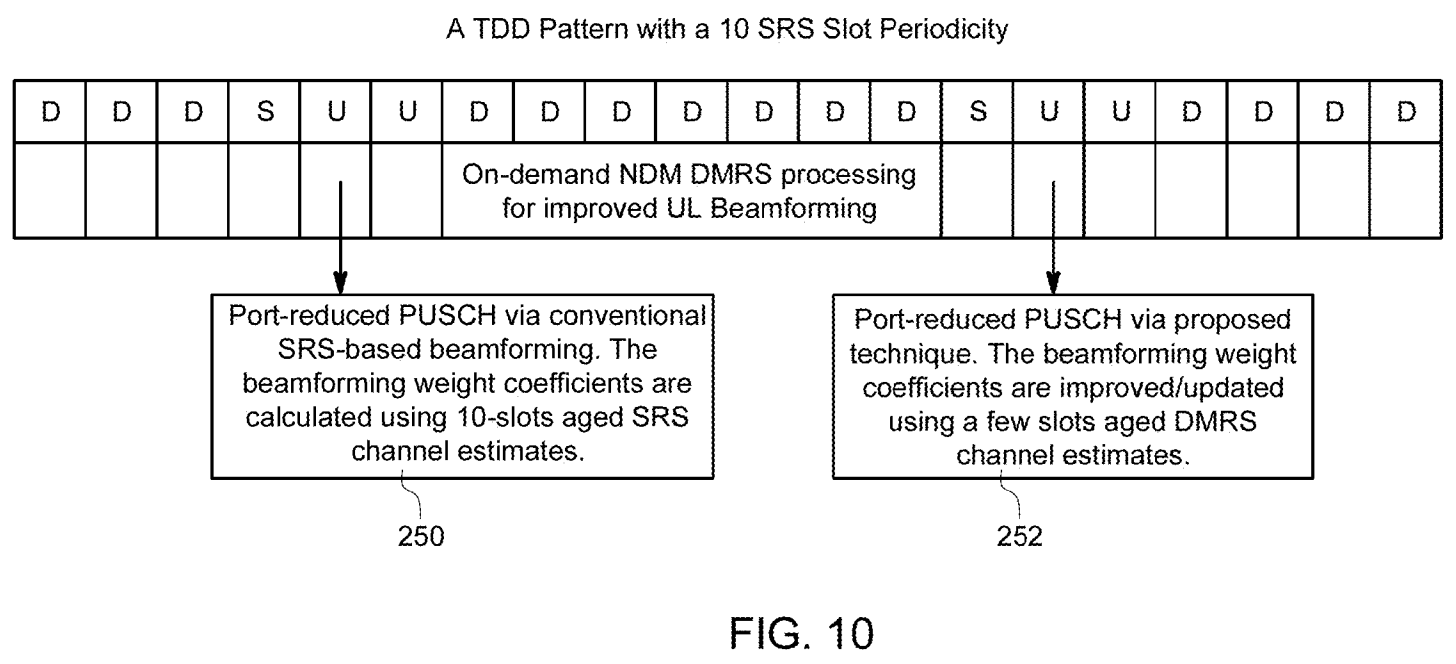

A TDD Pattern with a 10 SRS Slot Periodicity

| D | D | S | U | U | D | D | D | D | D | D | D | D | S | U | U | D | D | D | D |

On-demand NDM DMRS processing for improved UL Beamforming

Port-reduced PUSCH via conventional SRS-based beamforming. The beamforming weight coefficients are calculated using 10-slots aged SRS channel estimates.

250

Port-reduced PUSCH via proposed technique. The beamforming weight coefficients are improved/updated using a few slots aged DMRS channel estimates.

ON-DEMAND NON-DELAY MANAGED DEMODULATION REFERENCE SIGNAL FOR OPEN RADIO ACCESS NETWORK UTILIZING CHANNEL STATE INFORMATION

CROSS REFERENCE TO RELATED APPLICATIONS

This application claims the benefit of U.S. Application 63/496,449, filed Apr. 17, 2023, the contents of which are incorporated by reference herein.

BACKGROUND

1. Field of the Invention

The present disclosure is related to an efficient massive Multiple-Input Multiple-Output (mMIMO) system for Open Radio Access Network (O-RAN) based RANs. More particularly, the present disclosure is related to improving the uplink for massive mMIMO performance of O-RAN 7-2x compliant RANs.

2. Description of Related Art

Remote cell sites for mobile phones have been in use for many years. These remote sites include various 5G equipment including, for example, a Radio Access Network (RAN) and a core network. The RAN typically comprises three major components, which include a Radio Unit (RU), a Distributed Unit (DU) and a Central Unit (CU). A mid-haul network connects a DU server to a CU server and a back-haul network connects the CU server to the core network. The DU server and the RRU are typically co-located at a cell site of a 5G network. The CU server and the core network are co-located in a data center. Another architecture is the CU server being located at an aggregation point and the aggregation point connects to the core network at the data center.

Open Radio Access Network (O-RAN) is based on dis-aggregated components and connected through open and standardized interfaces is based on 3GPP NG-RAN. An overview of O-RAN with disaggregated RAN CU, DU, and RU, near-real-time Radio Intelligent Controller (RIC) and non-real-time RIC is illustrated in FIG. 1.

As noted with respect to FIG. 1, the O-RAN CU (O-CU) and the O-RAN DU (O-DU) are connected using the F1 interface (with F1-C for control plane and F1-U for user plane traffic) over the mid-haul (MH) path. One O-DU could host multiple cells (e.g., one O-DU could host 24 cells) and each cell may support many users. For example, one cell may support 600 radio resource control connected users and out of these 600, there may be 200 Active users (i.e., users that have data to send at a given point of time).

A front haul interface linking the O-DU with the O-RAN RU (O-RU) with a lower layer functional division has been standardized and has been widely adopted by the industry. Considering a 7-2x based architecture, some of the Physical Layer (PHY) functions are executed in the O-RU, whereas the remaining PHY functions are performed in the O-DU. For example, 7-2x Cat-B O-RUs perform the low PHY functionality (Fast Fourier Transform/Inverse Fast Fourier Transform (FFT/IFFT) and beamforming), and O-DUs perform the high PHY functionality (channel estimation, equalization, and decoding).

One of the main technologies that use the O-RAN 7-2x specifications is 4G/5G massive Multi-Input Multi-Output (mMIMO). In Single-User MIMO (SU-MIMO), the gNB serves a single user on a set of time-frequency resources, whereas in Multi-User MIMO (MU-MIMO) setup, the gNB serves multiple users on the same time-frequency resources. In Uplink (UL), User Equipment (UE) sends a Sounding Reference Signal (SRS) signal over a relatively long period of time, which is sent to the O-DU from the O-RU via the fronthaul interface in a Non-Delay Managed (NDM) manner. Using the SRS signal, the O-DU then obtains the UL channel estimates of the UEs, using which gNB performs user pairing (in the case of MU-MIMO) and calculates combining/digital beamforming matrix for the scheduled user(s). The O-DU sends the combining/digital beamforming matrix elements or weights to the O-RU, which in return applies these elements to the frequency-domain Physical Uplink Shared Channel (PUSCH) IQ samples received later and sends the resulting IQ samples to the O-DU for the rest of PHY processing. One aspect of the combining operation (using the combining/digital beamforming matrix) at O-RU is that it enables the O-RU to reduce the number of streams transferred from O-RU to O-DU to a value smaller than the number of RX antennas. It is particularly important in mMIMO systems, where the number of RX antennas is large, and transferring all received streams for Physical Uplink Shared Channel (PUSCH) to O-DU incurs significant and prohibitive front-haul bandwidth consumption.

Although split option 7-2x enables multiple advanced features, such as beamforming and Uplink Coordinated Multi-Point (UL COMP) reception, the system performance may degrade in certain scenarios, such as UL mMIMO for high-speed UEs and/or interference-limited scenarios, where there is significant inter-cell interference (ICI) from neighboring cells contaminating the UL signal from the desired UEs.

Performance Degradation in High Mobility Scenarios. The main reason for such degradation in high-speed UEs scenarios is channel aging. Specifically, the SRS signals are sent over a relatively long period of time (e.g., 10 s of milliseconds). By the time the O-RU applies the combining/digital beamforming matrix elements to the PUSCH symbols, these matrix elements become inaccurate since the SRS signals become outdated (i.e., SRS to UL-data TTI delay is relatively long). In other words, the channel gains between the UEs and the gNB at the time PUSCH is received are no longer reflected accurately by the SRS signals (since UEs are moving fast in such a scenario), which causes interference and hence throughput degradation during the combining process (using the combining/digital beamforming matrix) in the UL chain.

Performance Degradation in the Presence of Inter-Cell Interference (ICI): The main reason for performance degradation in the presence of ICI is signal dimension reduction at the O-RU. Squeezing a desired signal and interference signal into a smaller number of dimensions causes performance degradation of the interference rejection at the O-DU.

There have been several approaches to overcome the above problems without changing or by changing the existing O-RAN 7-2x standard. These different approaches have had limited success and are summarized below in 7-2x Standard Compliant Solutions and 7-2x Non-Standard Compliant Solutions.

A) 7-2x Standard Compliant Solutions. One approach to mitigate performance degradation in high mobility scenarios is by configuring SRS transmissions with shorter periodicities. However, shorter SRS periodicity decreases the SRS capacity (i.e., the number of UEs that can be configured to transmit SRS) because more resources are occupied by each UE for SRS transmission. Also, in a time-division duplex (TDD) system, there are certain limitations on SRS periodicity due to the TDD frame structure. A second approach to mitigate performance degradation in high mobility scenarios is to predict the UL channel of the PUSCH/PUCCH slot at the DU based on the UL channels of several previous SRS transmissions. In addition to the computation complexity of the underlying prediction algorithm, this approach has its own limitations on performance improvement depending on UE speeds. For scenarios with inter-cell interference, typical O-DU processing uses a minimum mean-squared error receiver with interference rejection combining (MMSE-IRC) to mitigate the impact of the interference. However, since the O-DU has access to the compressed PUSCH signal transferred from the O-RU, the performance of MMSE-IRC may be degraded compared to a typical 7-3 receiver where MMSE-IRC is computed based on and applied to the full-dimension signal.

B) 7-2x Non-Standard Compliant Solutions. One non-standard compliant solution is moving Demodulation Reference Signal (DMRS) channel estimation and beamforming weight calculation operations from the O-DU to the O-RU with a new split option. In this way, the beamforming weights can be calculated using the most-recent DMRS channel estimates, and the SRS channel aging issue is mitigated. Furthermore, the application of a whiting filter through DMRS channel estimates at the O-RU improves the Minimum Mean Square Error-Interference Rejection Combining (MMSE-IRC) as well. However, this solution increases the computational complexity of the O-RU, where computational resources are scarce. A second non-standard compliant solution is extracting the DMRS at the O-RU and calculating the beamforming weights at the O-DU using the most-recent DMRS channel estimates. Although it somewhat addresses the above issues, there will be a significant latency issue with this process, considering PUSCH is delay-managed traffic. Also, sending NDM DMRS for all users increases the FH bit rate significantly, although it might not be required for all scheduled UEs in the network.

Background on the O-RAN FH Messages. There are four planes specified in the O-RAN specs, namely, User-Plane (UP), Control Plane (CP), Synchronization Plane (SP), and Management Plane (MP). The existing O-RAN spec explains the exact method of sending the CP messages in the Downlink (DL) direction and sending/receiving the UP messages between the O-DU and the O-RU. A few of the focus points of this system and method are directed to CP message modifications and MP enhancements to enable On-Demand NDM DMRS.

Background on MP. The MP specifies the management plane protocols used over the fronthaul interface linking the O-RU with other management plane entities, which may include the O-DU, the O-RAN defined Service Management and Orchestration (SMO) functionality as well as other generic Network Management Systems (NMS).

In contrast to the CP, the MP refers to non-real-time management operations between the O-DU and the O-RU. Specifically, The Lower-Layer Split MP (LLS-M) facilitates the initialization, configuration, and management of the O-RU to support the stated functional split.

A NETCONF/YANG-based MP is used for supporting the management features, including "startup" installation, software management, configuration management, performance management, fault management, and file management towards the O-RU. The MP supports two architectural models:

1. Hierarchical model: The O-RU is managed entirely by one or more O-DU(s) using a NETCONF-based MP interface. When the O-RU is managed by multiple O-DUs, it is typically for enabling O-DU and/or transport connectivity redundancy capabilities.

2. Hybrid model: The hybrid architecture enables one or more direct logical interface(s) between management system(s) and O-RU in addition to a logical interface between O-DU and the O-RU.

Based on the transport topology, various modes of network connectivity are possible between the O-RU and the O-DU, and SMO. The basic requirement for M-Plane is to have end-to-end IP connectivity between the O-RU and the elements managing it (O-DU, SMO, or so-called "O-RU Controllers").

The MP provides the following major functionalities to the O-RU. These features are implemented using the NETCONF-provided functions such as "Startup" installation, SW management, Configuration management, Performance management, Fault Management, and File Management. The data models representing the M-Plane are organized as a set of reusable YANG modules.

Background on CP. The main purpose of the CP messages is to transmit data-associated control information required for the processing of user data (e.g., scheduling and beamforming commands). These messages are sent separately for DL-related commands and UL-related commands.

A common frame format is used for CP messages, comprising a transport layer and an application layer. The application layer is within the transport layer payload and comprises a common header for time reference, followed by information and parameters dependent and specific to the Section Type in use. Multiple sets of section data of the same Section Type value can be lined up one after another within the payload. To minimize packet rate over the interface, a transmitter should fill messages with as many subsequent sections (with or without sequential section IDs) as possible.

Section Type 1 is used for most Downlink and Uplink radio channels. The fields of Section type 1 are as follows: Transport Layer; Application Layer; Common Header Fields; dataDirection (data direction (gNB Tx/Rx)) field: 1 bit; payloadVersion (payload version) field: 3 bits; value="1" shall be set (1st protocol version for payload and time reference format); filterIndex (filter index) field: 4 bits; frameId (frame identifier) field: 8 bits; subframeId (subframe identifier) field: 4 bits; slotID (slot identifier) field: 6 bits; startSymbolid (start symbol id) field: 6 bits; numberOfsections (number of sections) field: 8 bits; sectionType (section type) field: 8 bits; value="1" shall be set; udCompHdr (user data compression header) field: 8 bits 11; reserved (reserved for future use) field: 8 bits; Section Fields; sectionId (section identifier) field: 12 bits; rb (resource block identifier) field: 1 bit; symInc (symbol number increment command) field: 1 bit; startPrbc (starting PRB of data section description) field: 10 bits; numPrbc (number of contiguous PRBs per data section description) field: 8 bits; reMask (resource element mask) field: 12 bits; numSymbol (number of symbols) field: 4 bits; ef (extension flag) field: 1 bit; beamId (beam identifier) field: 15 bits.

Accordingly, there is a need for a method relating to non-delay managed demodulated reference signals for O-RAN-Based Radio Access Networks that supports on-demand transfer of user-specific non-port-reduced DMRS over the O-RAN 7-2x fronthaul interface overcoming and/or mitigating one or more of the aforementioned and other deleterious effects of previous methods.

SUMMARY

What is needed is a system and method that provides for messaging between the O-DU and O-RU for on-demand non-delay-managed Demodulation Reference Signal (DMRS) transfer.

It is further desired to provide a system and method to improve the uplink massive Multiple-Input Multiple-Output (mMIMO) performance of O-RAN 7-2x compliant RANs.

It is still further desired to provide a system and method that facilitates non-port-reduced DMRS with higher over-the-air bandwidth over the fronthaul in a non-delay-managed manner without requiring additional FH capacity.

It is also desired to provide a system and method that improves the O-DU behavior in the non-port-reduced DMRS transfer based on the user-specific need for more rapid channel state information update by the O-DU.

It is further desired to provide a system and method that improves the O-RU behavior in the non-port-reduced DMRS transfer after receiving the user-specific request from the O-DU.

In one configuration a method and a system are provided to support the on-demand transfer of user-specific non-port-reduced DMRS over the O-RAN 7-2x fronthaul interface. The O-DU may send a request message to the O-RU with the DMRS configuration information, and the O-RU may extract, store and send the non-port-reduced DMRS data in a non-delay managed manner to the O-DU. The O-DU may identify one or more users that need a more rapid update of channel state information and trigger the non-port-reduced DMRS transfer based on at least the doppler speed of the user and/or the inter-cell interference level due to user density, in addition to the non-delay-managed bandwidth capacity of the O-RU. The non-port-reduced DMRS may be used by the O-DU to improve the beamforming weights for one or more users in later time slots.

Channel state information update needs might be based on multiple factors, including high mobility and high interference (please note that these are not the only conditions, they are just examples). Also, these conditions/factors could be independent of each other.

Some unique benefits of the system include but are not limited to: 1) Optimally leveraging the idle bandwidth on the uplink to transfer the user-specific non-port-reduced DMRS. This means that no extra fronthaul capacity is required; 2) The O-DU may calculate the available non-delay-managed bandwidth and select as many users as possible for non-delay-managed DMRS transfer; 3) More up-to-date channel state information to the DU to overcome the channel aging problem common in conventional SRS-based non-delay-managed transmission; 4) Improved user throughput by enabling more accurate beamforming (higher beamforming gain) to the user with higher mobility and to the users that may experience a higher level of inter-cell interference due to cell loading or user clustering; 5) The newly received DMRS symbol may be used as additional/newer inputs to improve the performance of the channel prediction algorithm, e.g., AI/ML-based channel prediction; and 6) Leverages the existing mechanism of the lower layer split of 7-B. It improves the performance of a selected number of users (e.g., high mobility users and higher interference), but it doesn't incur the additional O-RU (computational complexity) cost as in 7-2C. It helps strengthen 7-2B as a solid lower-layer split solution, even for high mobility and high interference use cases.

For this application, the following definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "first" and "second" are used to distinguish one element, set, data, object, or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a method for providing messaging between an Open Radio Access Network Distributed Unit (O-DU) and an Open Radio Access Network Radio Unit (O-RU) for on-demand non-delay-managed Demodulation Reference Signal (DMRS) transfer is provided, the method comprising the steps of: the O-DU identifying user devices requiring a first update of channel state information based on multiple factors including high mobility and high interference, and triggering the non-port-reduced DMRS transfer for these identified user devices, and the O-DU sending a request message from the O-DU to the O-RU with DMRS configuration information of these identified user devices that requires an update of their channel state information. The method further comprises the steps of: the O-RU extracting non-port-reduced DMRS data and transmitting the non-port-reduced DMRS data to the O-DU, and the O-DU using the non-port-reduced DMRS to update their channel state information and to improve beamforming weights for these user devices in later time slots.

The above-described and other features and advantages of the present disclosure will be appreciated and understood by those skilled in the art from the following detailed description, drawings, and appended claims.

DESCRIPTION OF THE DRAWINGS

FIG. 10 illustrates a sample on-demand NDM DMRS processing for improved PUSCH performance.

DETAILED DESCRIPTION

Figure 1:
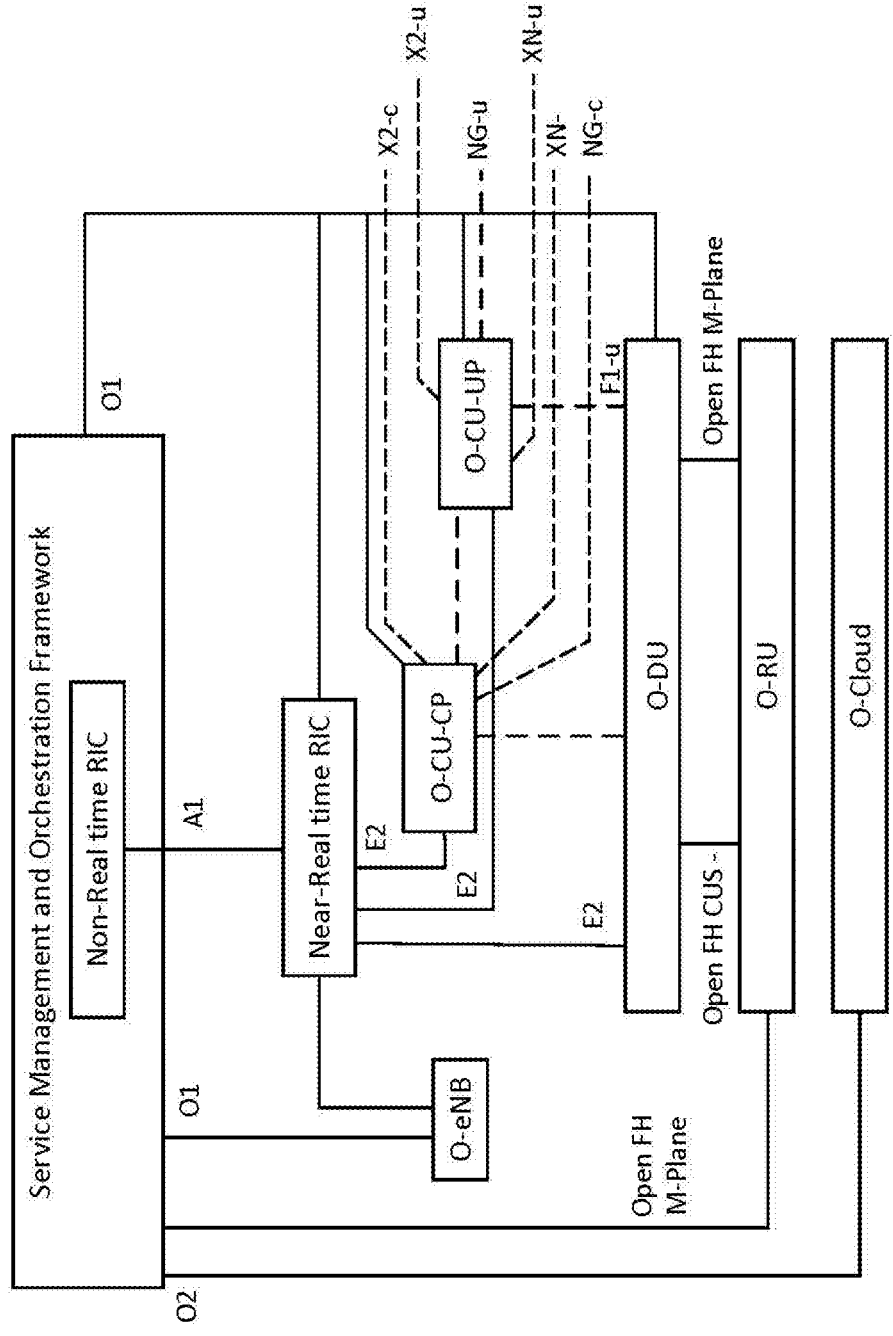
FIG. 1 is a block diagram of O-RAN architecture according to the prior art.

Referring now to the drawings, wherein like reference numerals designate corresponding structure throughout the views.

Figure 2:
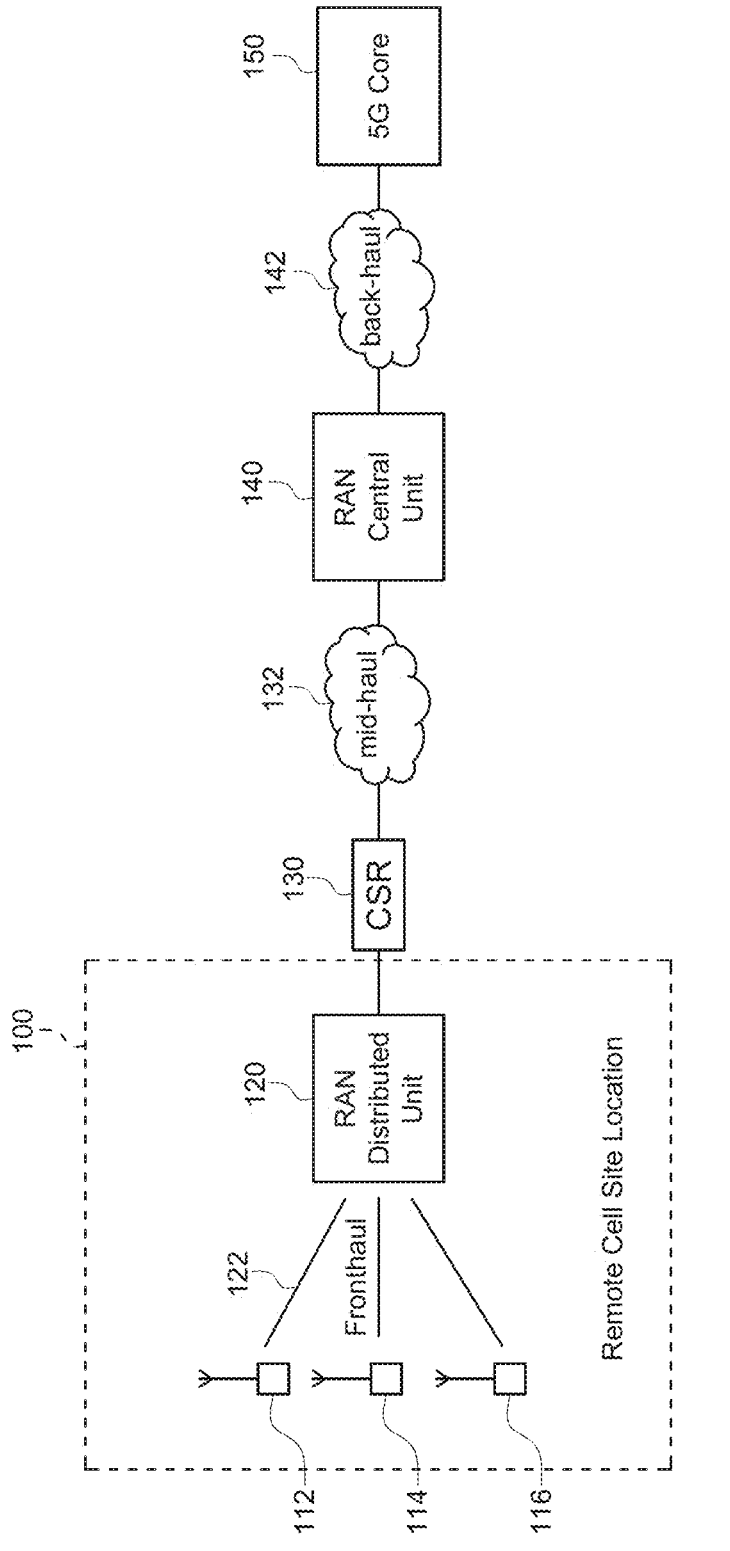
FIG. 2 is a diagram illustrating the various equipment used in a cell site location along with the connection to various control equipment used for telecommunications systems.

FIG. 2 shows a remote cell site location 100 illustrated by a dashed line. At the remote cell site location 100 a RAN DU (O-DU) server 120 is provided along with a CSR 130. The CSR 30 allows the RAN DU server 120 to communicate with RAN CU server 140 via mid-haul connection 132. Mid-haul connection 132 can be a public Wide Area Network (WAN) or a leased line connection over the WAN. The RAN CU server 140 communicates with 5G Core equipment 150 via back-haul connection 142.

The RAN DU server 120 at remote cell site 100 communicates wirelessly with Remote Radio Units (O-RUs) 112, 114, 116 via front-haul 122. It should be noted that while three RRUs are illustrated, additional RRUs may be connected to RAN DU server 120.

On-Demand NDM DMRS Processing. This configuration proposes that the O-DU 120 requests the O-RU 112 to send the non-port-reduced DMRS signal for one or more UEs over the fronthaul in a non-delay-managed manner according to O-DU's 120 need for an expeditious channel state information for the selected UEs. Accordingly, in one configuration, the O-DU first identifies user devices requiring channel state information, and then triggers the non-port reduced DMRS transfer.

Figure 3:
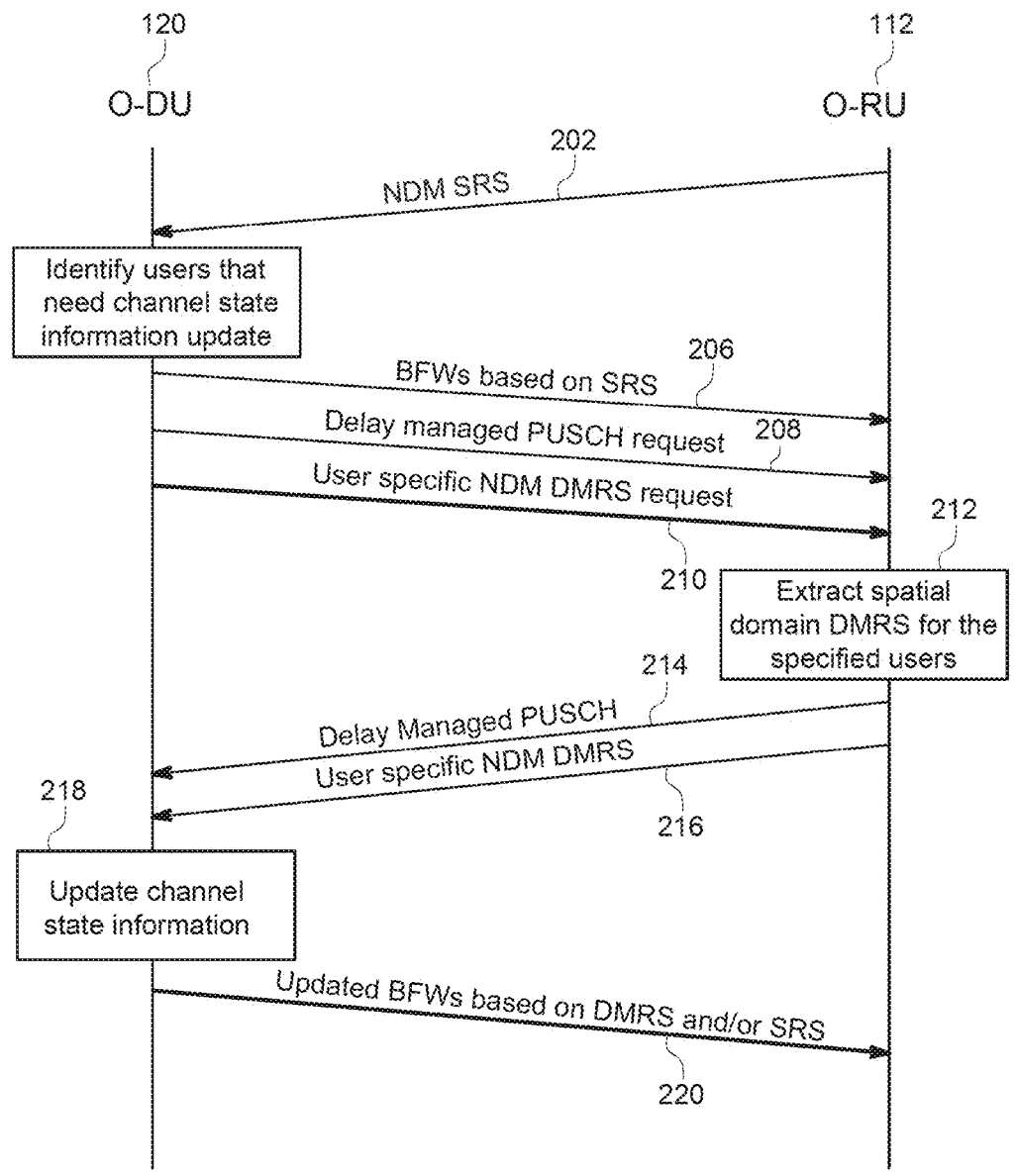
FIG. 3 is a flow diagram illustrating an exemplary configuration of messaging between the O-DU and O-RU for the on-demand non-delay-managed DMRS transfer.

Referring to FIG. 3, a message chart between the O-DU 120 and O-RU 112 is illustrated. More specifically, the O-RU 112 sends the conventional non-port-reduced SRS signal to the O-DU 120 in a non-delay-managed manner 202. The O-DU 120 may determine that one or more UE's channel state information may become outdated due to user mobility, or one or more UEs may experience a high level of interference due to cell loading/user clustering, which may benefit from non-port-reduced DMRS transfer 204. The O-DU 120 may also determine that if the uplink non-delay managed bandwidth capacity is sufficient to accommodate the intended user-specific non-port-reduced DMRS transfer according to at least the fronthaul bandwidth, downlink uplink duty cycle, the bandwidth for existing delay-managed data and non-delay-managed-data 206.

If the non-delay-managed bandwidth is available, the O-DU 120 may send a non-delay-managed DMRS request message to the O-RU 112 when scheduling the uplink PUSCH data transfer 208. This message may include the configuration information for user specific DMRS signals, such as frame number, subframe number, slot number, symbol number, starting PRB, number of PRBs, antenna sub-array index, etc. 210.

The O-DU 120 sends the conventional delay-managed port-reduced PUSCH data request to the O-RU 112 using the beamforming weights derived from the non-port-reduced SRS data. Once the O-RU 112 receives the non-port-reduced DMRS request message, it may extract and store the user-specific non-port-reduced DMRS signal in memory 212. In the meantime, the O-RU 112 may perform the conventional SRS-based port-reduction (i.e., beamforming) on the PUSCH (including DMRS) data and send the port-reduced PUSCH in a delay-managed manner 214. The O-RU 112 sends the user-specific non-port-reduced DMRS to the O-DU 120 after the delay-managed data transfer is complete 216.

The O-DU 120 may use the received non-port-reduced DMRS symbol to update the channel state information for one or more selected UEs 218. The updated channel state information can be used to derive updated beamforming weights for the subsequent transmission for the selected (one or more) UEs 220. Since the DMRS resources do not span the whole available bandwidth, L2/MAC scheduler has a constraint in scheduling resources to the UEs with updated beamforming weights. The resource allocation for these UEs will be performed considering the processed NDM-DMRS resources in the upcoming time slots.

A massive MIMO antenna typically comprises many antenna elements. Each antenna element may receive the same uplink signal with slightly different amplitude and phase, which can then be combined to form one or more beams by applying a set of complex weights to the received signals at the antenna elements. The number of beams (or spatial streams) is typically much smaller than the number of antenna elements. This processing is also referred to as beamforming, where the signal dimension is much reduced (from the number of antenna elements to the number of beams). We refer to the signal after beamforming as a port-reduced signal and the signal received at the antenna element as a non-port-reduced signal hereinafter.

Figure 4:
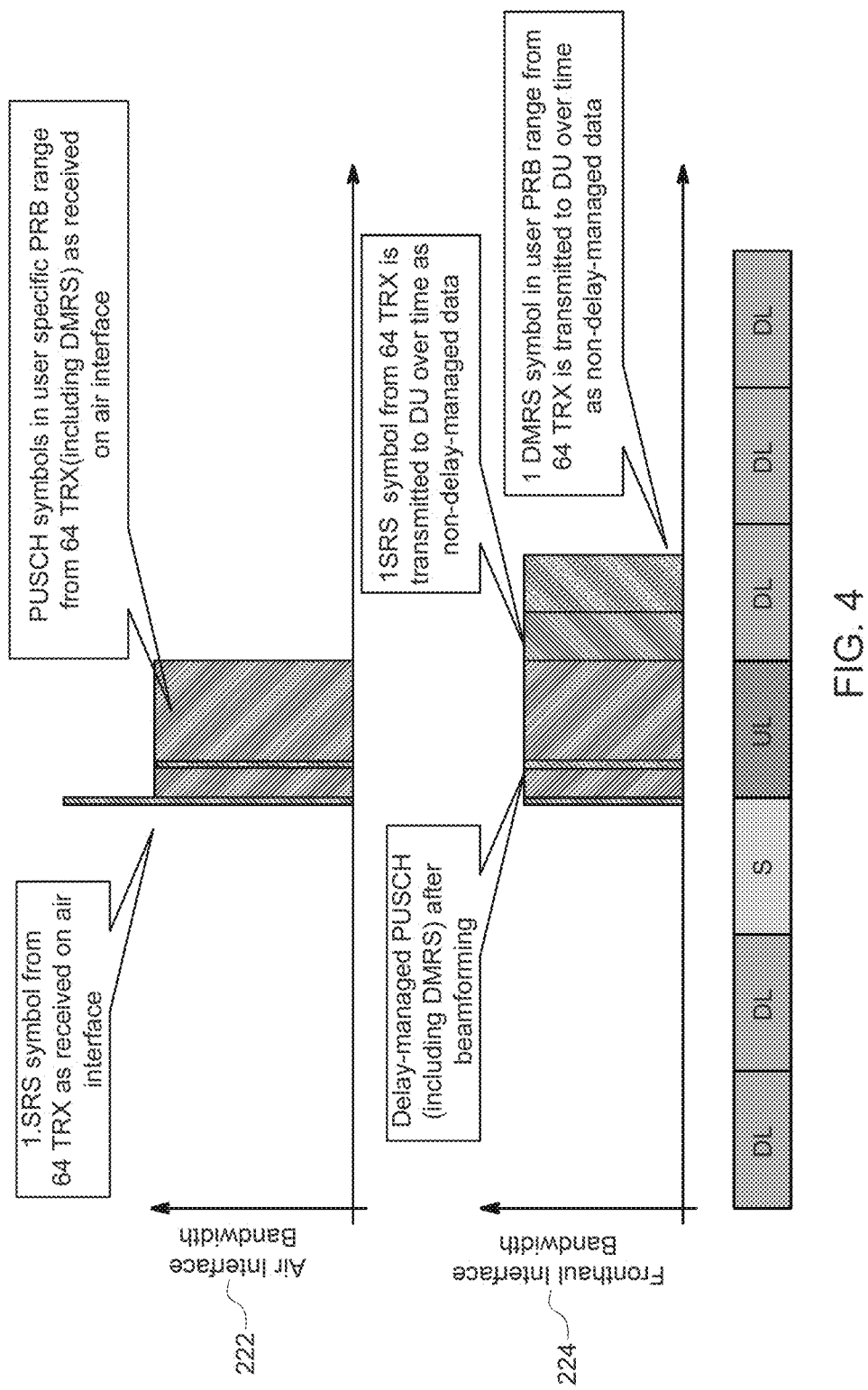
FIG. 4 is a bandwidth diagram illustrating the non-port-reduced DMRS with higher over-the-air bandwidth can be sent over the fronthaul in a non-delay-managed manner without requiring additional FH capacity.

As shown in FIG. 4, a non-port-reduced signal (received through the air interface bandwidth 222) has a much larger instantaneous bandwidth. After performing the beamforming operation, the signal's bandwidth can be reduced to match that of the fronthaul interface bandwidth 224. The top plot of FIG. 4 shows an example of non-port-reduced SRS and PUSCH, where the SRS uses the full carrier bandwidth, whereas the PUSCH uses a partial carrier bandwidth over the air interface. The non-port-reduced PUSCH includes a DMRS symbol.

According to the 7-2B spec, the SRS signal needs to be sent to the O-RU 112 in the non-port-reduced format to the O-DU 120 to derive the beamforming weights.

Uplink data can be categorized into non-delay-managed data and delay-managed data. Delay-managed data is time sensitive and needs to arrive in the O-DU 120 within a certain receive window to meet the system latency requirement. On the other hand, some other traffic (e.g., SRS) is not as time sensitive and may be sent through the fronthaul over time when the delay-managed data transfer has been completed. Due to the half-duplex nature of TDD, the uplink data may also use the fronthaul bandwidth during the downlink slots. The O-DU 120 can derive the available non-delay-managed bandwidth capacity for user-specific non-port-reduced DMRS transfer.

As shown in FIG. 4, the non-port-reduced uplink PUSCH (including DMRS) is beamformed (resulting in reduced bandwidth) and sent over the front-haul 122 with minimal delay. After that, the non-delay-managed data (e.g., the SRS signal and the non-port-reduced DMRS), is retrieved from the memory and is sent over the front-haul 122 in a non-delay-managed manner during the downlink slot time.

It will be appreciated by those of skill in the art that the method can be mapped to O-RAN low layer split 7-2B to provide improvement in the uplink and downlink performance.

Figure 5:
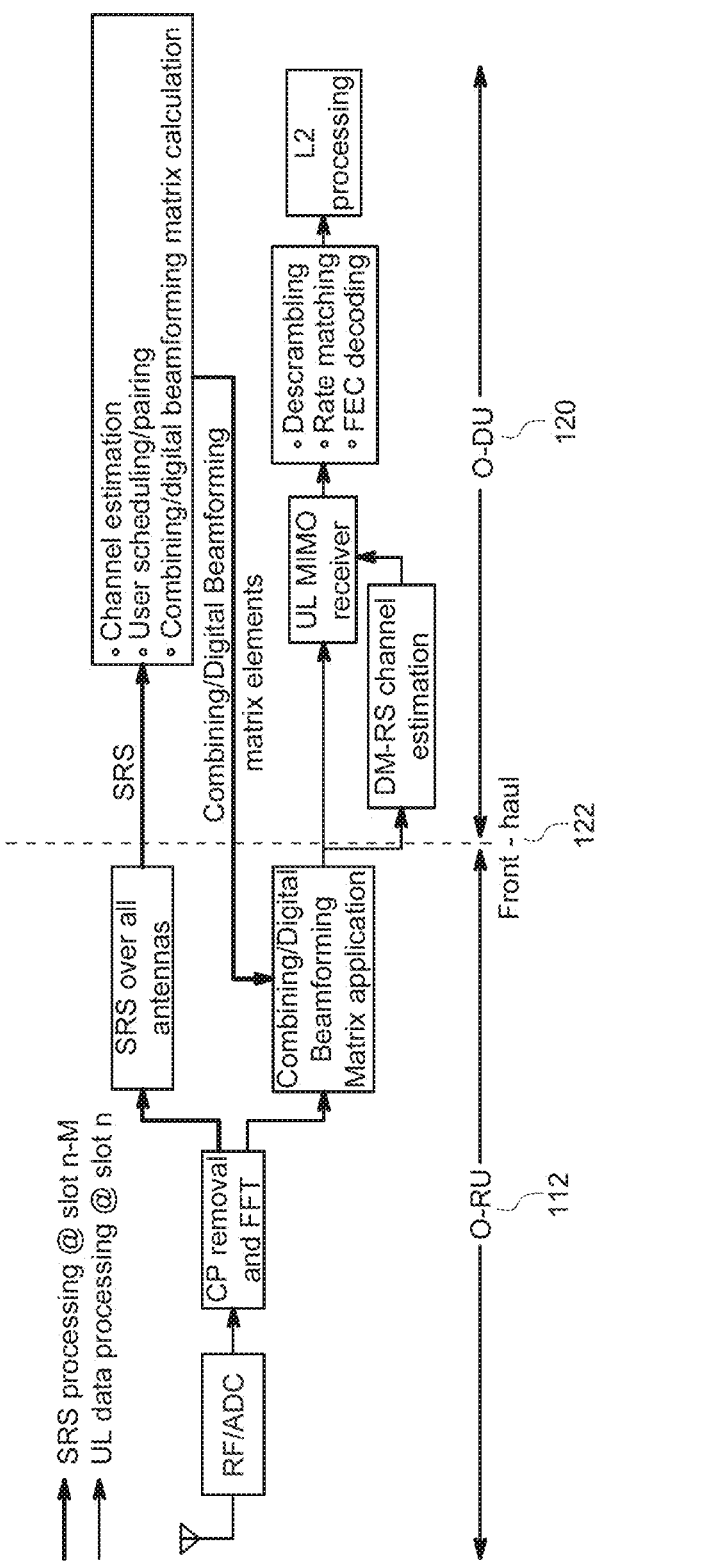
FIG. 5 is a block diagram of the existing art in O-RAN lower layer split 7-2B where only non-port-reduced SRS signal is sent over the fronthaul in a non-delay-managed manner.

FIG. 5 illustrates the 7-2B split in the current art. As can be observed in FIG. 5, the non-port-reduced SRS data (i.e., SRS signal from all antenna ports) is sent by the O-RU 112 over the front-haul 122 interface in a non-delay-managed manner to the O-DU 120. The O-DU 120 performs the channel estimation, channel covariance calculation, and user pairing based on the SRS signal, which subsequently derives the beamforming weights (BFWs) for the users. These BFWs are sent over the front-haul 122 interface to the O-RU 112.

Figure 6:
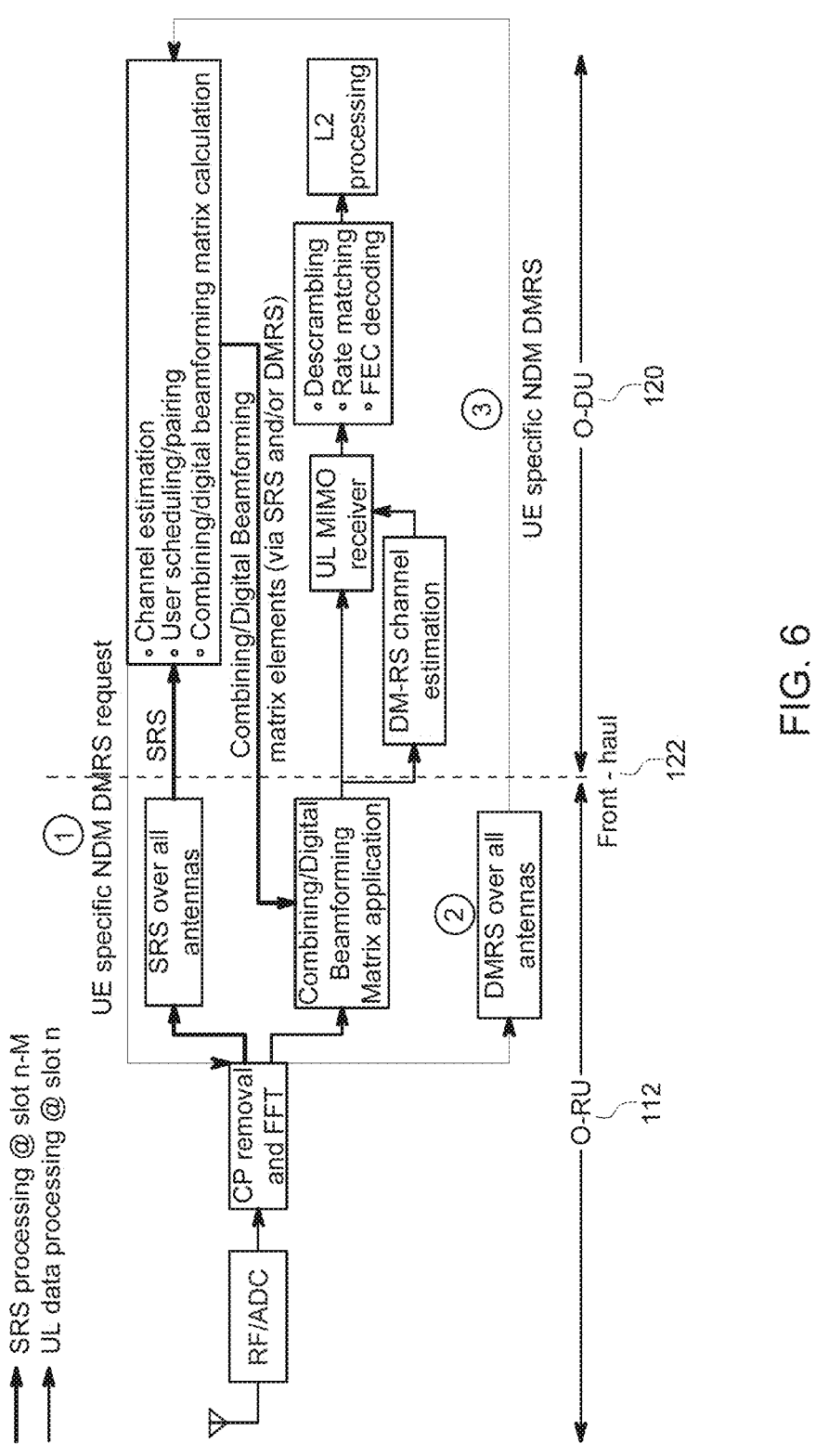
FIG. 6 is a block diagram of the exemplary embodiment of the O-RAN lower layer split 7-2B, where the non-port-reduced DMRS is sent over the fronthaul in addition to the SRS in a non-delay-managed manner.

FIG. 6 depicts the new data path that supports non-delay-managed DMRS in the existing framework of the 7-B split. The O-DU 120 may send a user-specific DMRS request to the O-RU 112 in addition to the conventional SRS. Afterward, the O-RU 112 may send the user-specific DMRS on all antennas (i.e., non-port-reduced) in addition to SRS to the O-DU 120 in a non-delay-managed manner. The O-DU 120 may perform the channel estimation, channel covariance estimation, and user pairing based on the more recent non-delay-managed DMRS and derive the new beamforming weights for the user to the O-RU 112. Alternatively, the O-DU 120 may combine the channel state information obtained from non-delay-managed DMRS and SRS to update the channel state information (e.g., performing a moving average of channel covariance from SRS and DMRS through a low pass filter).

Figure 7:
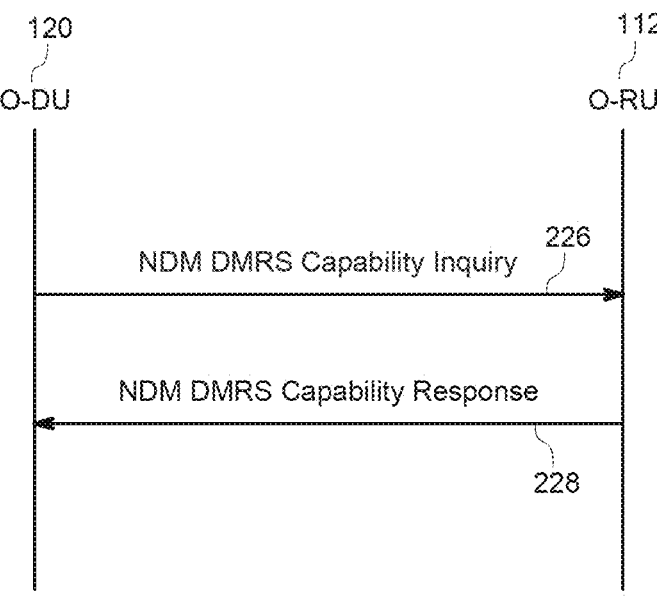
FIG. 7 is a flow diagram that illustrates the capability signaling between the O-DU and the O-RU.

FIG. 7 is a flow diagram of capability signaling to support NDM DMRS, wherein the O-DU 120 may send an inquiry message 226, which includes the NDM DMRS capability support to the O-RU 112. The O-RU 112 may subsequently send a response message 228 that may comprise the O-RU's

112, 114, 116 capabilities to support NDM DMRS, including such information as the NDM memory storage capacity. The O-DU 120 may use this information to estimate how much non-delay-managed data (e.g., DMRS and/or SRS) can be stored at a certain time.

Figure 8:
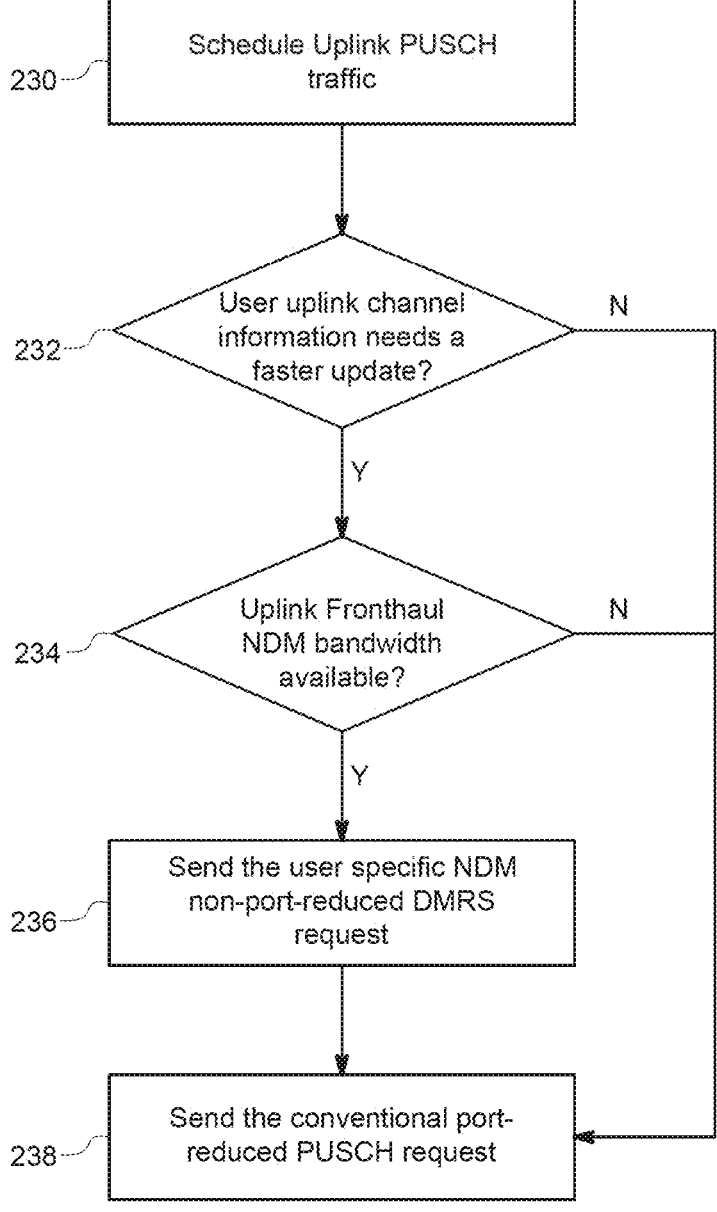
FIG. 8 is a flow diagram of the O-DU behavior in the non-port-reduced DMRS transfer based on the user-specific need for more rapid channel state information update by the O-DU.

FIG. 8 is a flow diagram of the O-DU 120 to support NDM DMRS 230. For example, the O-DU 120 may determine the need for a more rapid channel state information update for one or more UEs 232. Afterward, the O-DU 120 may also consider the availability of the non-delay-managed front-haul 122 bandwidth capacity 234. If both conditions are met, the O-DU 120 may send the non-port-reduced DMRS request 236 alongside the conventional port-reduced PUSCH request 238. The non-port-reduced DMRS request may include such information as frameId, subframeId, slotId, numDMRSSymbol, symbolId, startPrbc, numPrbc, ReMask, SequenceId, eAxCIDset, etc.

Figure 9:
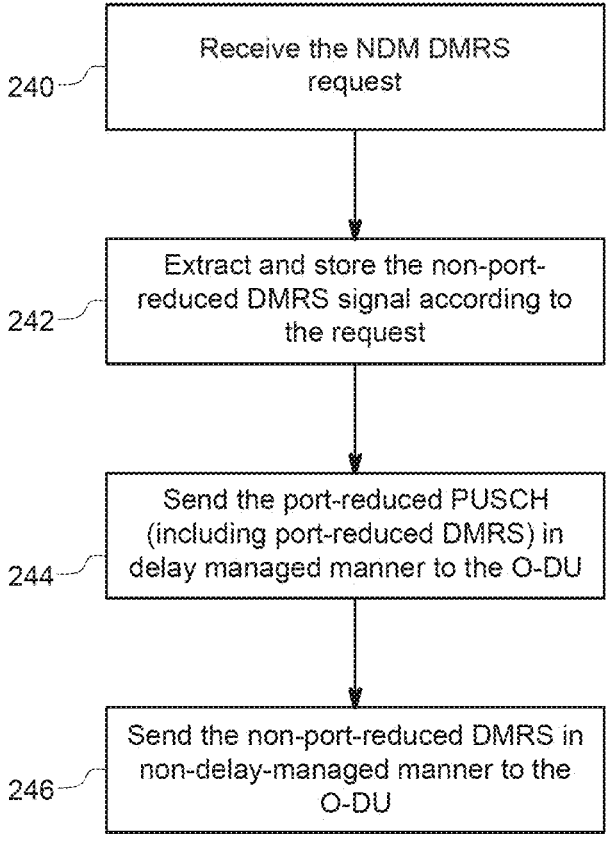
FIG. 9 is a flow diagram of the O-RU behavior in the non-port-reduced DMRS transfer after receiving the user-specific request from the O-DU.

FIG. 9 is a flow diagram that illustrates the behavior of the O-RU 112 to support NDM DMRS according to the flow diagram of FIG. 8. After the O-DU 120 receives the non-port-reduced DMRS request 240, it may extract the non-port-reduced DMRS symbols (e.g., DMRS values from all or a subset of Transceiver (TRX) ports) and store them in an internal memory temporarily 242. In the meantime, the O-RU 112 may perform port-reduction (i.e., beamforming) on the received PUSCH symbols and send the port-reduced PUSCH (including DMRS) to the O-DU 120 in a delay-managed manner 244. When the delay-managed data transfer is complete, the O-RU 112 may transfer the non-delay-managed data (e.g., the non-port-reduced DMRS data) over the fronthaul interface 246.

FIG. 10 illustrates a sample on-demand NDM DMRS processing for improved PUSCH performance. Conventionally, O-DU 120 calculates the UL beamforming weights (BFWs) through SRS channel estimates and sends them to O-RU 112 for beamforming (a.k.a. port-reduction) 250. However, the SRS CEs become outdated depending on the channel coherence time and decrease the PUSCH performance. With the proposed method, on-demand NDM DMRS can be used to improve/update the channel estimates that are used in the UL beamforming weight coefficient calculation 252. This method is especially critical in high-mobility scenarios.

Exemplary O-RAN Messages to Enable On-Demand NDM DMRS.

Example M-Plane Message to Enable On-Demand NDM DMRS. The O-RU 112 can report its capabilities to O-DU 120 including the "on-demand NDM DMRS" support. In one configuration, the O-RU 112 exposes its ability to support "on-demand NDM DMRS" to the SMO or the O-RU 112 controller in the o-ran-module-cap.yang. One example of the proposed ru-supported-category leaf under the ru-capabilities structure in the o-ran-module-cap.yang can be shown as follows:

```
grouping ru-capabilities {
    description
        "Structure representing set of capabilities.";
    leaf ru-supported-category {
        type enumeration {
            enum CAT_A {
                description
                    "Informs that precoding is not supported in O-RU";
            }
            enum CAT_B {
                description
                    "Informs that precoding is supported in O-RU";
```

-continued

```
    }
    enum CAT_B_NDM_DMRS {
        description
            "Informs that precoding is supported in O-RU along with the on-demand NDM
DMRS feature.";
        }
    }
    description
        "Informs about which category O-RU supports";
}
```

Example C-Plane Message to Enable On-Demand NDM DMRS. If the on-demand NDM DMRS feature is supported by the O-RU 112 and configured by the SMO/O-RU controller, the O-DU 120 appends the UL C-plane message sent in the DL to the O-RU 112 with a section extension and includes the DMRS configuration parameters (such as the parameters listed in Table 1 and Table 2) to enable the O-RU 112 to extract DMRS information.

DMRS Precoding and Mapping to Physical Resources.

The orthogonality of the DMRS sequences that are allocated to the different antenna ports is achieved by multiplexing in time, frequency, and code domains. To realize this, the DMRS sequence is multiplied with the orthogonal cover codes in time and frequency domains (i.e., $w_t(k)$ and $w_f(k)$ respectively). Also, shifts in the frequency domain are included to support more antenna ports. The DMRS sequence, r(m) is mapped to an intermediate quantity $$\tilde{a}_{k,l}^{(\tilde{p}_j,\mu)}$$

as follows:

$$\tilde{a}_{k,l}^{(\tilde{p}_j,\mu)} = w_f(k') \; w_t(l') \; r(2n + k')$$

$$k = \begin{cases} 4n + 2k' + \Delta & \text{Configuration Type 1} \\ 6n + k' + \Delta & \text{Configuration Type 2} \end{cases}$$

$$k' = 0, 1$$

$$l = \bar{l} + l'$$

$$n = 0, 1, \dots$$

$$j = 0, 1, \dots, v - 1$$

where $w_f(k')$, $w_t(l')$, and $\Delta$ are defined by Tables 6.4.1.1.3-1 and Tables 6.4.1.1.3-2 in TS 38.211. Also, $\tilde{p}_j$ represents the antenna port for transmission layer j. However, DFT-s-OFDM supports only single-layer transmission, and j is equal to 0 when transform-precoding is enabled.

Figure 11:
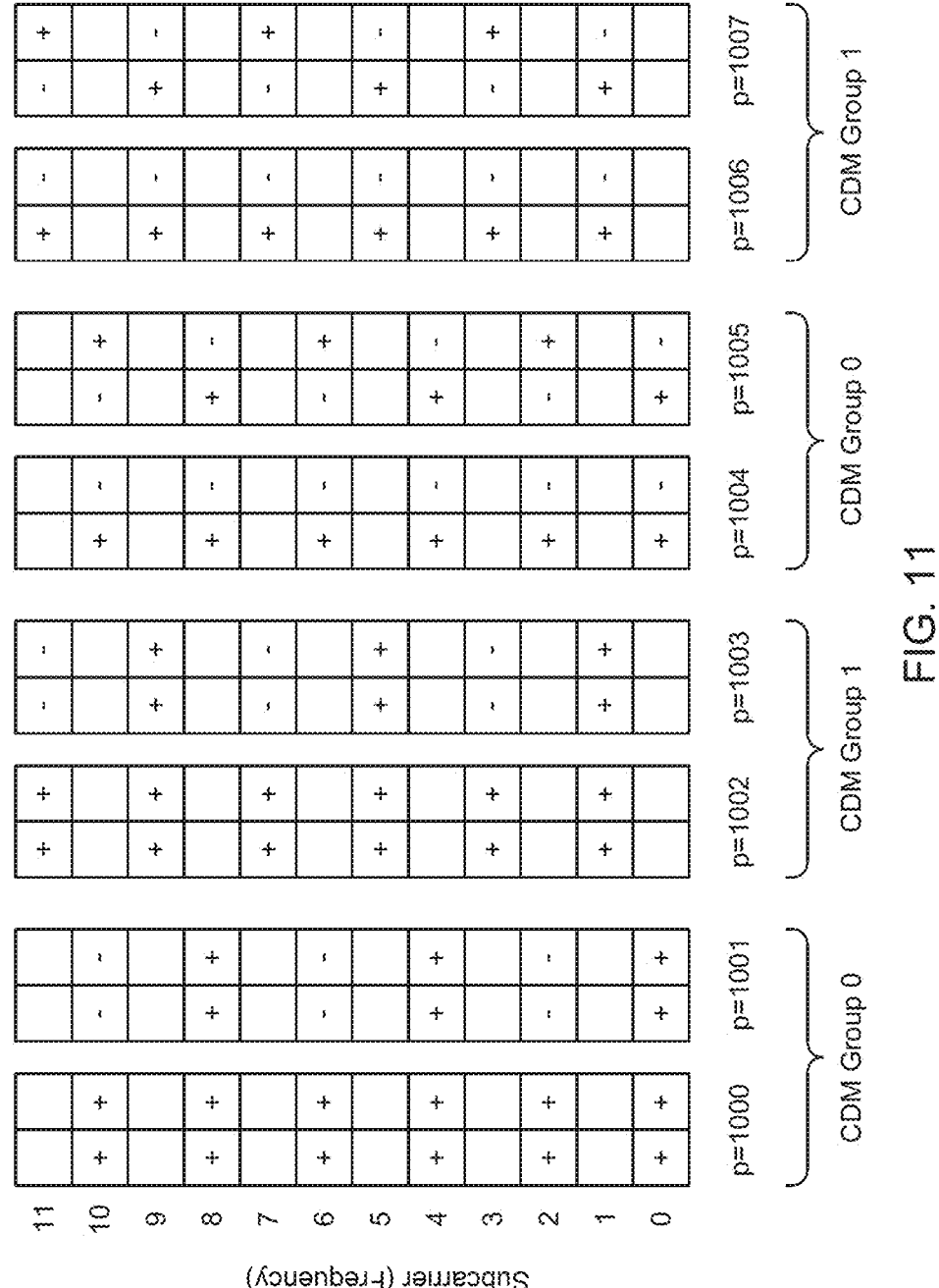
FIGS. 11-15 clarify the 5G NR DMRS structure with examples for a better understanding.
Figure 12:
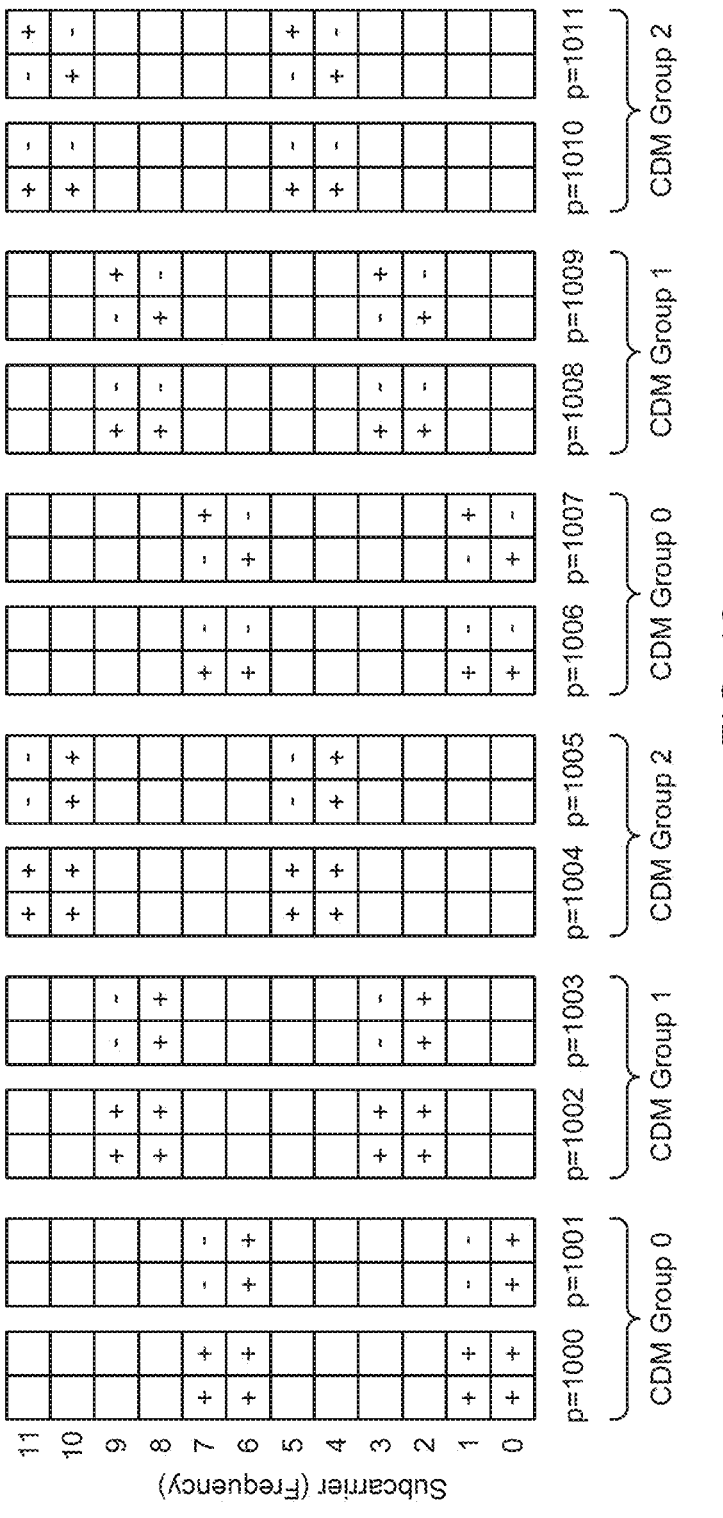

The DMRS configuration type determines the DMRS density in the frequency domain, which also impacts the available number of orthogonal sequences. DMRS configuration Type 1 has a higher density in the frequency domain and provides a more accurate channel estimation. On the other hand, DMRS configuration Type 2 has a lower density in the frequency domain, and it allows supporting more antenna ports. Type 1 can support up to 8 antenna ports, whereas Type 2 can support up to 12 antenna ports. These are illustrated in FIGS. 11 and 12, along with the associated mapping and orthogonal cover codes.

The reference point for k depends on the waveform type. For CP-OFDM (i.e., when transform precoding is disabled), k is subcarrier 0 in the common resource block. On the other hand, for DFT-s-OFDM (i.e., when transform precoding is enabled), k is subcarrier 0 of the lowest-numbered RB of the scheduled PUSCH allocation.

Figure 13:
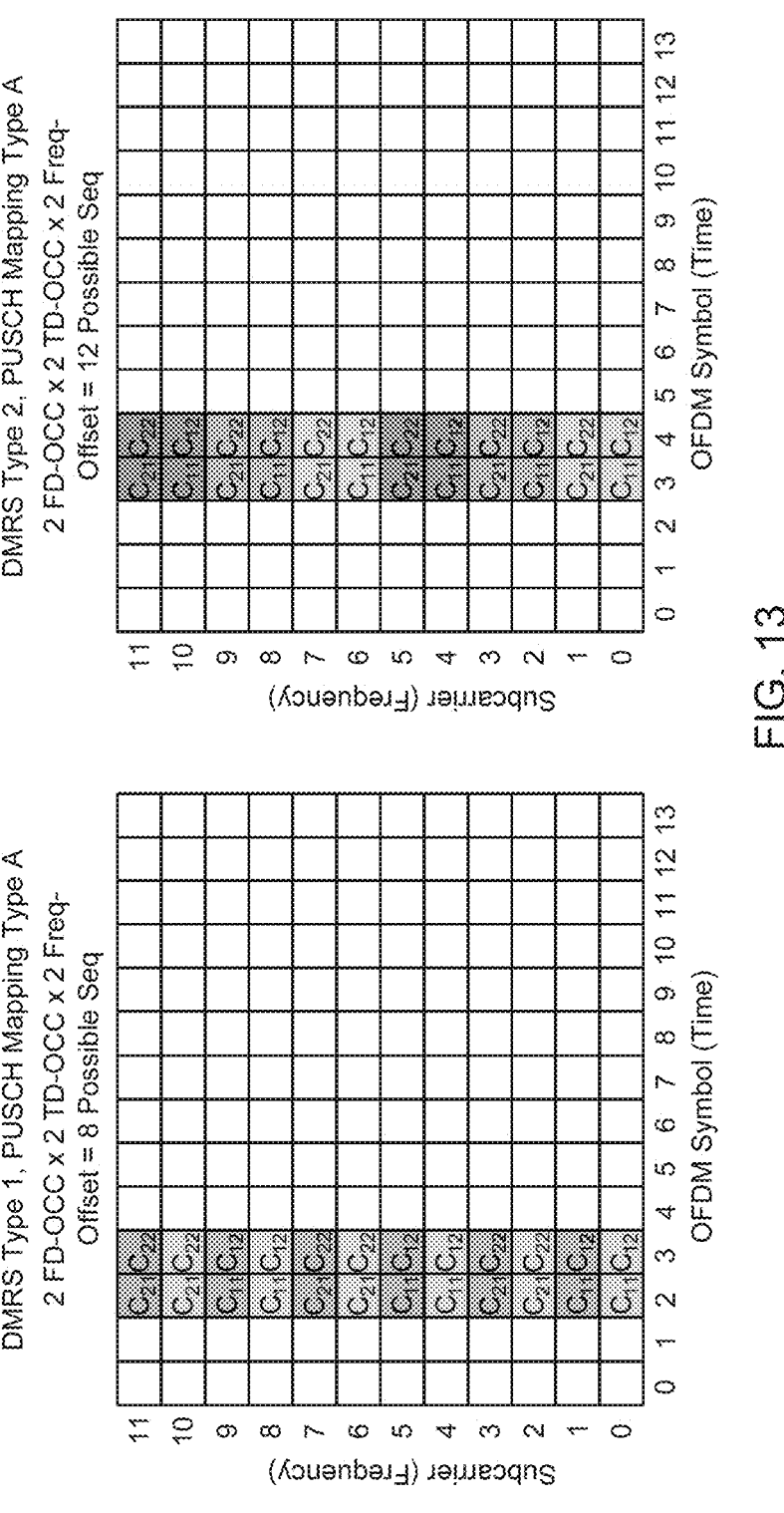
Figure 14:
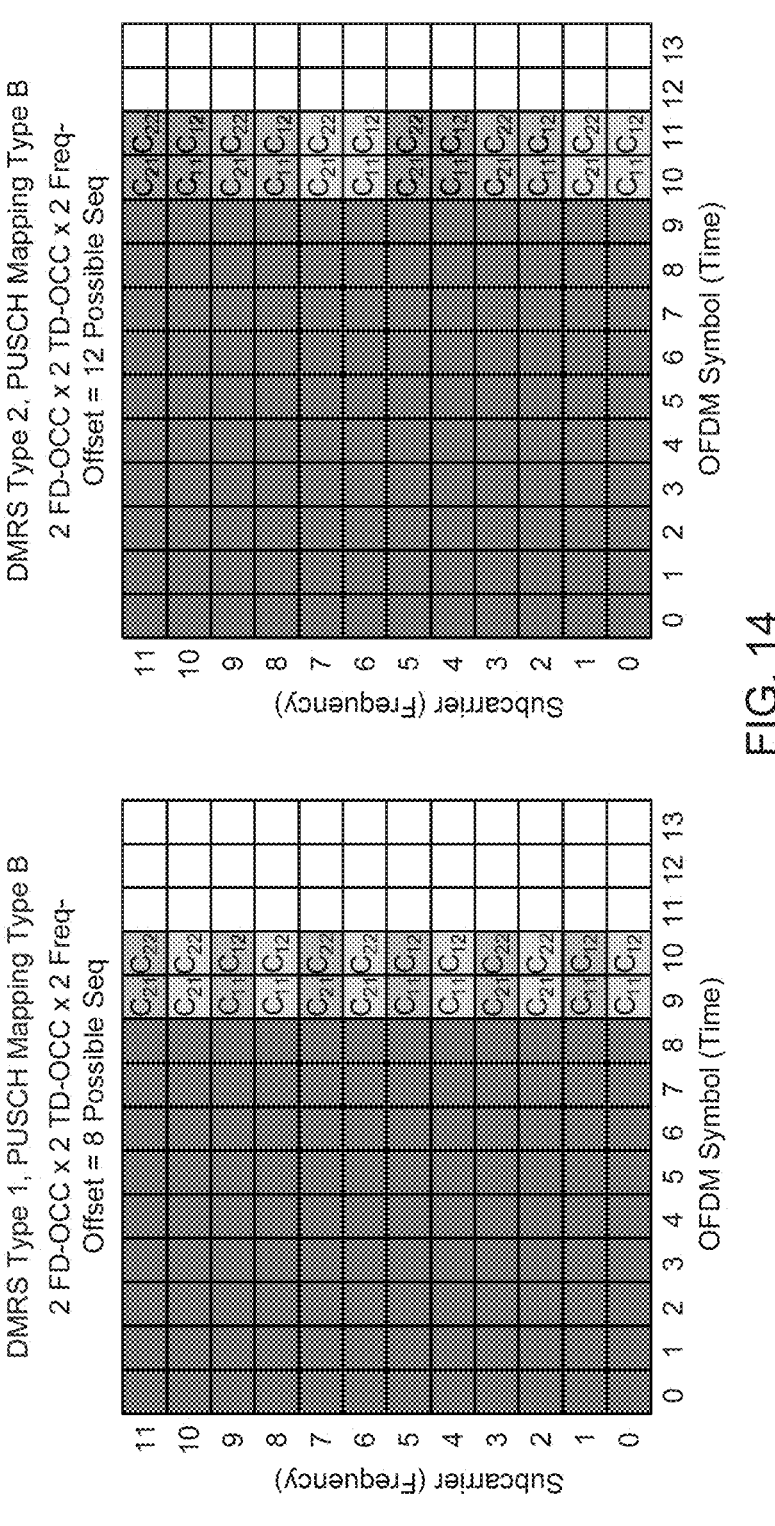

The reference point of l and the position of the first DMRS symbol ($l_0$) depends on the PUSCH mapping type and activation of the frequency hopping scheme. For PUSCH Mapping Type A, l is defined relative to the start of the slot if frequency hopping is disabled, and it is defined relative to the start of each hop if frequency hopping is enabled. $l_0$ is indicated by dmrs-TypeA-Position parameter, and it refers to either the third or fourth OFDM symbol in a slot. On the other hand, for PUSCH Mapping Type B, I is defined relative to the start of the scheduled PUSCH resources if frequency hopping is disabled, and it is defined relative to the start of each hop if frequency hopping is enabled. In this case, $l_0$ equals to 0; in other words, it refers to the first symbol in the scheduled data symbol duration. Exemplary DMRS mappings are illustrated in FIGS. 13 and 14 for PUSCH Mapping Type A and PUSCH Mapping Type B accordingly.

Figure 15:
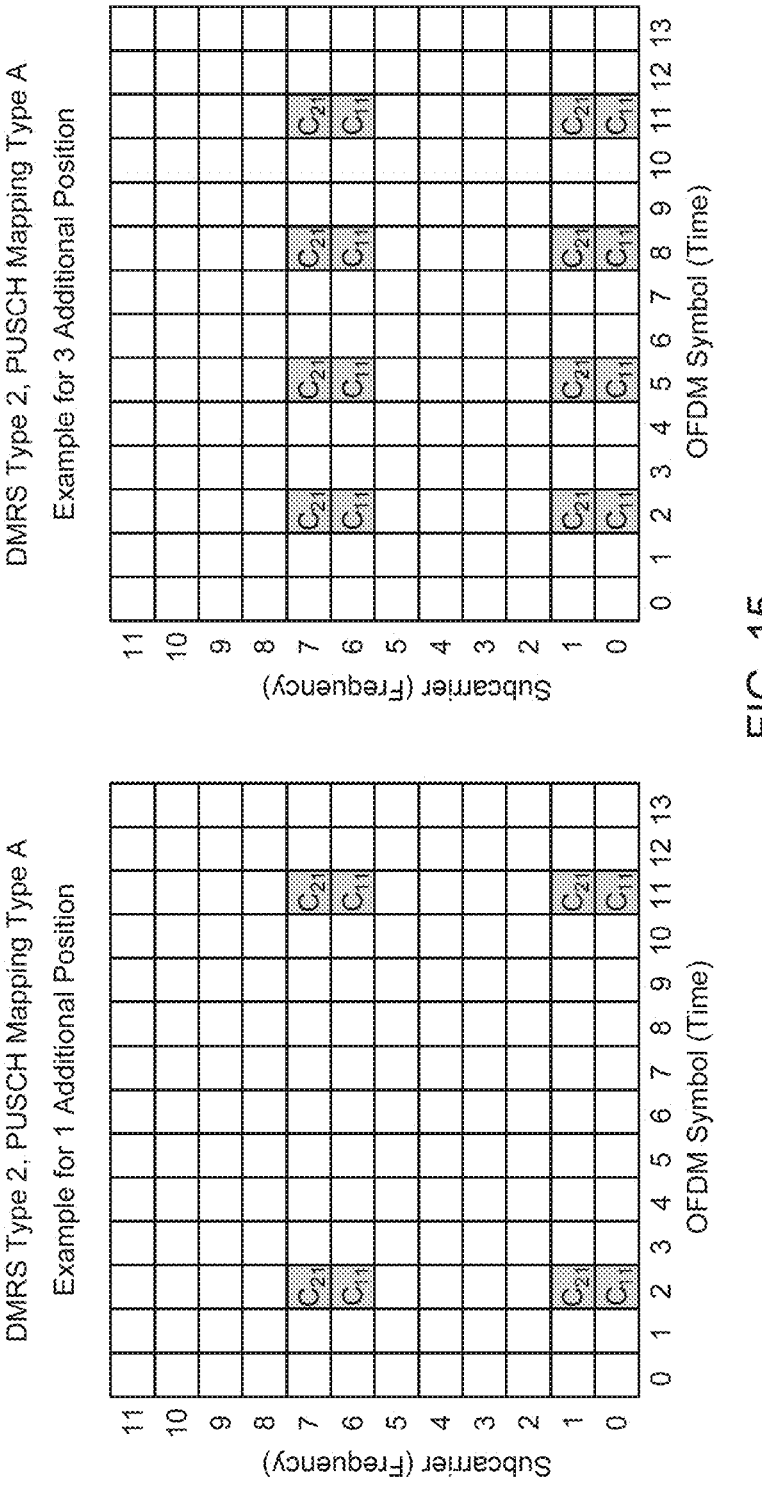

The position(s) of the DMRS symbols is provided by $\bar{l}$ parameter, and it depends on the PUSCH mapping type, activation of the frequency hopping scheme, and the number of additional DMRS symbols. Up to 4 DMRS symbols (i.e., up to 3 additional positions) in a slot are possible for high mobility scenarios. Exemplary DMRS allocations with additional positions are presented in FIG. 15. The position(s) of the DMRS symbols ($\bar{l}$), the time-domain index (l'), and the supported antenna ports $\tilde{p}_j$.

In the following step, the intermediate quantity, $$\tilde{a}_{k,l}^{(\tilde{p}_j,\mu)}$$

is precoded with W, multiplied with the amplitude scaling factor $$\beta_{PUSCH}^{DMRS}$$

and mapped to the physical resources as follows:

$$\begin{bmatrix} a_{k,l}^{(0,\mu)}(m) \\ \vdots \\ a_{k,l}^{(\tilde{p}_v-1,\mu)}(m) \end{bmatrix} = \beta_{PUSCH}^{DMRS} \; W \begin{bmatrix} \tilde{a}_{k,l}^{(0,\mu)}(m) \\ \vdots \\ \tilde{a}_{k,l}^{(\tilde{p}_v-1,\mu)}(m) \end{bmatrix}$$

where $$\beta_{PUSCH}^{DMRS} = 10^{-\frac{\beta_{DMRS}}{20}}$$

and $\beta_{DMRS}$ is given by Table 6.2.2-1 in TS38.214. The required $\beta_{DMRS}$ value is signaled with the number of DMRS CDM groups without data parameter. The required precoding matrix is signaled through the TPMI index parameter.

Essential DMRS configuration-related parameters are given in Table 1, and they are included in the C-plane message to enable the O-RU 112 to extract DMRS information. Also, Table 2 gives an example look-up table for the DMRS granularity in the time, frequency, and spatial domains to improve fronthaul bitrate efficiency. Each indicator (i.e., $N_1$ to $N_8$) can be set to a certain T/F/S resource set.

TABLE 1

| Parameter | Brief Description | Value Range |
|---|---|---|
| dmrs-Type | DMRS Configuration Type | {1, 2} |
| dmrs-maxLength | Single Symbol or Double Symbol | {1, 2} |
| dmrs-TypeA-Position | DMRS Start Pos for Type A | {pos2, pos3} |
| dmrs-AdditionalPosition | Additional DMRS Position | {0, 1, 2, 3} |
| p̃ | Antenna Port Index | {0, 1, . . . , 11} |
| TransformPrecoding | Enable/disable transform precoding | {0, 1} |
| dmrs-Type | DMRS Configuration Type | {1, 2} |
| dmrs-maxLength | Single Symbol or Double Symbol | {1, 2} |

TABLE 2

| Bitfield | NDM DMRS Granularity |
|---|---|
| 000 | $N_1$ |
| 001 | $N_2$ |
| 010 | $N_3$ |
| 011 | $N_4$ |
| 100 | $N_5$ |
| 101 | $N_6$ |
| 110 | $N_7$ |
| 111 | $N_8$ |

Table Section ExtType=21: Section description for DMRS configuration parameters. This (example) section extension enables the O-DU 120 to provide the DMRS configuration parameters needed at the O-RU 112 to extract DMRS information.

TABLE

| Section Extension Type 21 | | | | | | | |
|---|---|---|---|---|---|---|---|
| ef | | | extType = 0 × 15 | | | 1 | Octet N |
| | | | extLen | | | 1 | N + 1 |
| dmrs-Type | dmrs-maxLength | dmrs-TypeA-Position | dmrs-AdditionalPosition | TP | reserved | reserved | 1 | N + 2 |
| | | p̃ | | NDM-DMRS-Granularity | reserved | 1 | N + 3 |

Dmrs-Type
Description: This parameter is used to indicate the "DMRS Configuration Type" parameter.

Value range: {00b: Type-1; 01b: Type-2}.
Type: binary.
Field length: 1 bit.
Default Value: 0

Dmrs-maxLength
Description: This parameter is used to indicate the "DMRS maximum length".
Value range: {00b: Single Symbol; 01b: Double Symbol}.
Type: binary.
Field length: 1 bit.
Default Value: 0

Dmrs-TypeA-Position
Description: This parameter is used to indicate the "DMRS start position for PUSCH mapping Type A".
Value range: {00b: pos2; 01b: pos3}.
Type: binary.
Field length: 1 bit.
Default Value: 0

Dmrs-AdditionalPosition
Description: This parameter is used to indicate the additional DMRS position.
Value range: {00b: 0; 01b: 1; 10b: 2; 11b: 3}.
Type: unsigned integer.
Field length: 2 bits.
Default Value: 00

TP
Description: This parameter is used to indicate if "transform precoding" is enabled or disabled.
Value range: {00b: Disabled; 01b: Enabled}.
Type: binary.
Field length: 1 bit.
Default Value: 0 p̃
Description: This parameter is used to indicate antenna port index.
Value range: {0000b to 1011b}.
Type: unsigned integer.
Field length: 4 bits.
Default Value: 0000

NDM-DMRS-Granularity
Description: This parameter is used to indicate the NDM DMRS granularity.
Value range: {000b to 111b}.
Type: unsigned integer.
Field length: 3 bits.
Default Value: 000

Example U-Plane Message to Enable On-Demand NDM DMRS. Extracted NDM DMRS at O-RU 112 can be transferred to O-DU 120, like NDM SRS in the U-Plane. I and Q samples of the DMRS signal are appended after the header information.

Alternative configurations to the above-described may include, for example, but is not limited to: 1) Varying the time-domain sparsity of non-port-reduced DMRS (e.g., use fewer DMRS symbols); 2) Varying the frequency-domain sparsity non-port-reduced DMRS (e.g., transfer one DMRS RE per PRB rather than all the DMRS REs); 3) Varying the dimension of non-port-reduced DMRS (e.g., select a subset of the TRX ports rather than the full TRX ports of the RU); and 4) Varying the on-demand based signaling arrangement (e.g., for certain users, a semi-persistent or even periodic non-port-reduced DMRS transfer may be arranged as long as the need for prompt continuous channel state information update is warranted).

It will be further understood to one of skill in the art that various applications to the above-described system could include, but are not limited to, the O-DU 120 determining that one or more UEs require a more rapid channel state information update and requests non-port-reduced DMRS transfer in a non-delay-managed manner from the O-RU 112 according to O-RU 112 capability and the available non-delay-managed fronthaul bandwidth.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method providing messaging between an Open Radio Access Network Distributed Unit (O-DU) and an Open Radio Access Network Radio Unit (O-RU) for on-demand non-delay-managed Demodulation Reference Signal (DMRS) transfer comprising the steps of:

the O-DU identifying user devices requiring a first update of channel state information based on multiple factors including high mobility and high interference, and triggering the non-port-reduced DMRS transfer for these identified user devices;

the O-DU sending a request message from the O-DU to the O-RU with DMRS configuration information of these identified user devices that requires an update of their channel state information;

the O-RU extracting non-port-reduced DMRS data and transmitting the non-port-reduced DMRS data to the O-DU;

the O-DU using the non-port-reduced DMRS to update their channel state information and to improve beamforming weights for these user devices in later time slots.

2. The method according to claim 1, wherein the user device comprises a plurality of user devices where some of the user devices are identified as requiring the first update of channel state information and some of the user devices are identified as requiring a second update of channel state information.

3. The method according to claim 1, wherein the step of the O-DU identifying a user device requiring the first update of channel state information further comprises:

triggering the non-port-reduced DMRS transfer based on a non-delay-managed bandwidth capacity.

4. The method according to claim 3, further comprising the step of:

the O-DU determines availability of a fronthaul bandwidth, a downlink uplink duty cycle, a bandwidth for existing delay-managed data and non-delay-managed-data.

5. The method according to claim 4, further comprising the step of:

the O-DU sends the non-port-reduced DMRS request alongside a conventional port-reduced Physical Uplink Shared Channel (PUSCH) request.

6. The method according to claim 5, wherein the non-port-reduced DMRS request includes information selected from the group consisting of: frameId, subframeId, slotId, numDMRSSymbol, symbolId, startPrbc, numPrbc, ReMask, SequenceId, eAxCIDset, and combinations thereof.

7. The method according to claim 1, wherein the request message comprises a non-port-reduced DMRS request.

8. The method according to claim 1, wherein the non-port-reduced DMRS data extracted by the O-RU includes DMRS values from all or a subset of Transceiver (TRX) ports, the method further comprising the step of:

temporarily storing the DMRS values.

9. The method according to claim 1, further comprising the steps of:

the O-RU performing port-reduction on received Physical Uplink Shared Channel (PUSCH) symbols;

the O-RU transmitting the port-reduced PUSCH symbols to the O-DU in a delay-managed manner; and the O-RU transferring non-port-reduced DMRS data over a fronthaul interface in a non-delay-managed manner.

10. The method according to claim 1, wherein the O-RU communicates its ability to support an on-demand NDM DMRS feature to the O-DU.

11. The method according to claim 10, wherein the communication from the O-RU to the O-DU is in o-ran-module-cap.yang.

12. The method according to claim 10, wherein if the on-demand NDM DMRS feature is supported by the O-RU and an O-RU controller has configured the O-RU accordingly, the O-DU appends an Uplink (UL) Control plane (C-plane) message sent in a Downlink (DL) to the O-RU with a section extension and includes DMRS configuration parameters to enabling the O-RU to extract DMRS information.

13. The method according to claim 10, wherein orthogonality of DMRS sequences are allocated to different antenna ports.

14. The method according to claim 13, wherein the orthogonality of the DMRS sequences that are allocated to the different antenna ports is achieved by multiplexing in time, frequency, and code domains.

15. The method according to claim 14, wherein the DMRS sequences are multiplied with orthogonal cover codes in time and frequency domains and shifts in a frequency domain are included to support additional antenna ports.

16. The method according to claim 15, wherein a DMRS configuration type determines a DMRS density in the frequency domain and an available number of orthogonal sequences.

17. The method according to claim 16, wherein a first DMRS configuration includes a first density in the frequency domain, and a second DMRS configuration includes a second density in the frequency domain;

wherein the second density is lower than the first density;

wherein the second DMRS configuration allows for a greater number of antenna ports than the first DMRS configuration.

18. The method according to claim 17, wherein the first DMRS configuration supports up to eight (8) antenna ports and the second DMRS configuration supports up to twelve (12) antenna ports.

* * * * *